A. E. MILLER.
SHOCK ABSORBER FOR VEHICLES.
APPLICATION FILED JUNE 21, 1916.
1,209,190.
Patented Dec. 19, 1916.
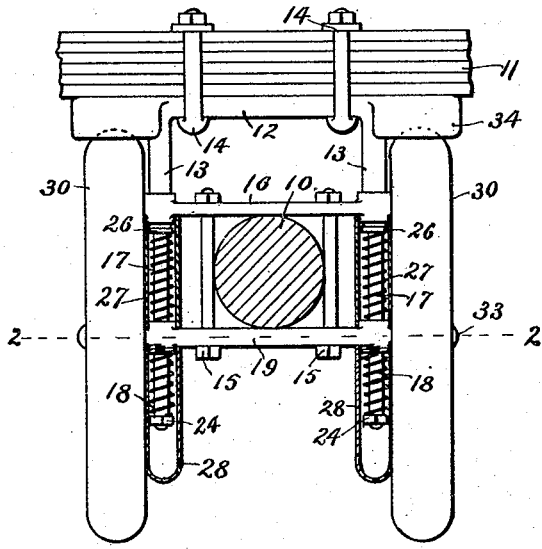
Fig. 1
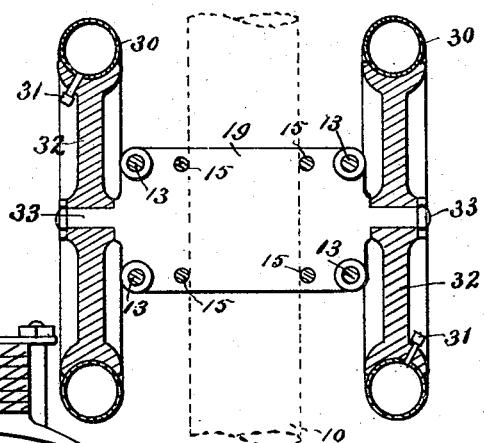
Fig. 2
Fig. 3
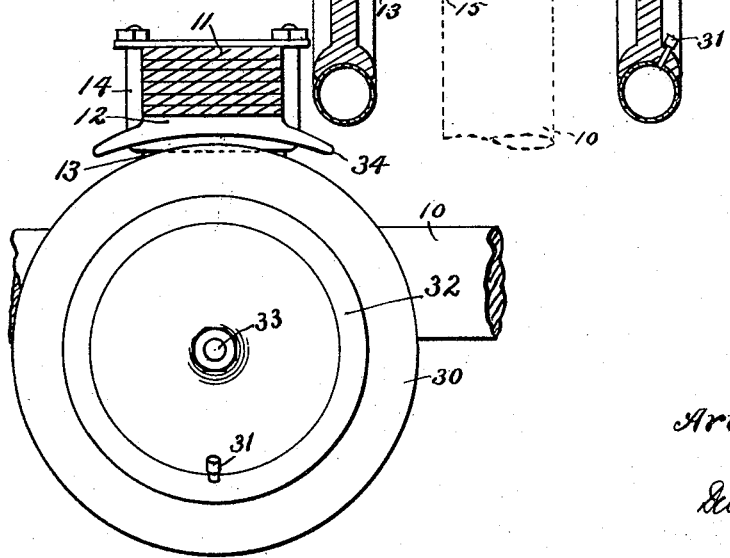
INVENTOR
Arthur E. Miller
BY
Albert H Decker
ATTORNEY

UNITED STATES PATENT OFFICE.

ARTHUR E. MILLER, OF SACRAMENTO, CALIFORNIA.

SHOCK-ABSORBER FOR VEHICLES.

1,209,190.

Specification of Letters Patent.

Patented Dec. 19, 1916.

Application filed June 21, 1916. Serial No. 104,912.

*To all whom it may concern:*

Be it known that I, ARTHUR E. MILLER, a citizen of the United States, residing at Sacramento, in the county of Sacramento and State of California, have invented certain new and useful Improvements in Shock-Absorbers for Vehicles, of which the following is a specification.

The purpose of this invention is to produce a more absolute and satisfactory shock absorber than those depending solely upon metallic springs or solely upon pneumatic cushions.

Therefore the invention consists in the combination of the two and in the structure of parts and their association for the specified purpose substantially as herein set forth and claimed.

In the accompanying drawing which forms a part of this specification Figure 1 represents in partially sectionized side elevation the improved shock absorber; Fig. 2 shows a horizontal section thereof taken in the plane indicated by line 2—2 in Fig. 1; and Fig. 3 is an end elevation of the shock absorber.

This improved shock absorber is preferably located between the axles typified at 10 and the vehicle springs typified at 11. The device has a substantial plate 12 with posts 13 projecting therefrom parallel to one another and at right angles to the plate with which they are integrally formed. This basic structure may be rigidly secured to a vehicle spring by clips 14. Movement relative to each other is provided between the axle and vehicle spring by mounting upon posts 13 a plate 16 provided with holes through bosses at its corners for the free passage of the posts and rigidly securing the axle to said plate. The axle may be so secured in any desirable manner as by means of clips or bolts 15 passed through plate 16 and another plate 19 at the opposite side of the axle. Plate 19 also has perforated bosses at its corners by which it too has sliding attachment with the posts 13. Upon said posts are placed spiral springs 17 which bear against plate 19 and shoulders or collars 26 just below plate 16. Other springs 18 are located below plate 19 and are confined upon posts 13 by nuts 24. Both sets of springs are preferably incased to protect them from dirt. The casings for springs 17 may consist of tubes 27 seated about the bosses on plates 16 and 19 and the casings for springs 18 may be cups 28 screwed to bosses on the underside of plate 19.

The shock absorber thus far described is similar to that disclosed in my application for patent filed June 6, 1916. The springs 17 take the shocks of concussion and springs 18 resist rebound. To assist the springs 17 and soften the shocks of concussion pneumatic cushioning devices are added which are preferably in the form of rubber rings indicated at 30 and provided with inflating nipples indicated at 31. These rings are like small tires and are mounted on grooved disks 32 which are centrally supported upon axles or studs 33 projecting from plate 19. The plate 12 is extended at its ends to overhang the rings 30 as indicated at 34. These overhanging portions are preferably arched and extended at the sides of plate 12 (Fig. 3) to afford a longer bearing surface for the rings and the radius of said bearing surfaces is preferably greater than that of the rings. The rings may normally touch the extensions 34 but preferably do not till a load is put upon the springs 11 or a thrust of concussion is transmitted from the axle 10. The disks 32 may or may not be journaled for rotation upon their studs 33.

The invention claimed is—

1. The combination with a plate provided with posts projecting therefrom at right angles a plate perforated to receive said posts springs on said posts to resiliently limit the relative movements of said plates, and pneumatic tired disks mounted upon one of said plates in position to engage their tires with projections on the other of said plates.

2. The combination with a plate provided with posts projecting therefrom at right angles a plate perforated to receive said posts a third plate also constructed to slide upon said posts, bolts or clips for holding said sliding plates together and confining the axle between them springs upon said posts for limiting the movement of the united plates studs projecting from the ends of the third plate, disks centrally mounted upon said studs, and resilient rings carried on the periphery of said disks for the purpose specified.

In testimony whereof I have affixed my signature.

ARTHUR E. MILLER.

Copies of this patent may be obtained for five cents each, by addressing the "Commissioner of Patents, Washington, D. C."